(12) United States Patent
Böhnke et al.

(10) Patent No.: US 6,567,374 B1
(45) Date of Patent: May 20, 2003

(54) DATA AND PILOT MAPPING IN AN OFDM SYSTEM

(75) Inventors: Ralf Böhnke, Esslingen (DE); Seiichi Izumi, Fellbach (DE)

(73) Assignee: Sony International (Europe) GmbH, Berlin (DE)

( * ) Notice: Subject to any disclaimer, the term of this patent is extended or adjusted under 35 U.S.C. 154(b) by 0 days.

(21) Appl. No.: 09/250,905

(22) Filed: Feb. 16, 1999

(30) Foreign Application Priority Data

Feb. 18, 1998 (EP) ............................................. 98102833

(51) Int. Cl.$^7$ ............................................... H04L 27/26
(52) U.S. Cl. ...................... 370/203; 370/208; 370/503; 375/260
(58) Field of Search ................................ 370/203, 206, 370/208, 210, 503; 375/260, 285, 295, 296

(56) References Cited

U.S. PATENT DOCUMENTS

| | | | |
|---|---|---|---|
| 6,002,716 A | * 12/1999 | Meyer et al. ............... | 375/231 |
| 6,275,506 B1 | * 8/2001 | Fazel et al. ................. | 370/478 |
| 6,307,892 B1 | * 10/2001 | Jones et al. ................ | 375/296 |

FOREIGN PATENT DOCUMENTS

EP          0 752 779 A          1/1997

OTHER PUBLICATIONS

Nikula, Malkamäki: "High bit rate services for UMTS using wideband TDMA carriers"; 1996 IEEE International Conference on Universal Personal Communications, Sep. 29, 1996 –Oct. 2, 1996, New York, pp. 562–566, XP002071479.

Gudmundson et al.: "Evolution of the GSM air interface into wideband services" IEE Colloquium on Advanced TDMA Techniques and Applications, Oct. 28, 1996, New York, pp. 2/1–5, XP002071480.

* cited by examiner

*Primary Examiner*—Thanh Le
(74) *Attorney, Agent, or Firm*—Frommer Lawrence & Haug LLP; William S. Frommer

(57) ABSTRACT

The present invention relates to a wireless transmission method and a wireless transmission system using an OFDM system comprising a plurality of equally spaced subcarriers. According to the present invention a data and pilot mapping in an OFDM system is proposed. One timeslot thereby comprises two symbols S1, S2, which are OFDM-modulated and have the same time duration. Besides a short guard time and roll-off times, a midamble MA is introduced between the respectively two OFDM-modulated symbols. The time duration of the midamble thereby corresponds to 1/n of the time duration of the symbols S1, S2, n being an integer greater than 1. In case the midamble is also OFDM-modulated, only every n-th subcarrier of the OFDM system is modulated when transmitting the midamble MA. Alternatively the midamble can be transmitted using a single carrier modulation scheme. The midamble MA can be used to transmit pilot symbols for a channel estimation such as to provide a coherent detection. Alternatively or additionally the midamble can be used to transmit symbols to be used for a correlation technique such as to provide time and frequency synchronization of the transmission scheme.

22 Claims, 5 Drawing Sheets

DATA AND PILOT MAPPING IN AN OFDM SYSTEM

The present invention relates to the mapping of data and pilot symbols in an OFDM-system.

BACKGROUND OF THE INVENTION

Pilot symbols are necessary for a channel estimation such as to effect coherent detection of e.g. OFDM-modulated signals. The use of pilot symbols for channel estimation, however, introduces overhead and it is thus desirable to keep the number of pilot symbols to a minimum. The number of needed pilot symbols for a desired bit error rate and Doppler frequency is highly dependent on the propagation (channel) characteristics as well as the pilot pattern used in orthogonal frequency division multiplex (OFDM) systems.

A mobile channel introduces multipath distortion of the signaling wave forms. Both the amplitude and phase are corrupted and the channel characteristics changes because of movements of the mobile station.

In order to perform coherent detection, reliable channel estimates are required. This can be obtained by occasionally transmitting known data or so-called "pilot symbols". The receiver interpolates the channel information derived from the pilots to obtain the channel estimate for the data signal. Coherent modulation gives a good performance, but because of the necessary channel estimation, it requires more complexity at the receiver side.

Orthogonal frequency division multiplexing (OFDM) has been proposed recently for several broadcast systems and there is a growing interest in using the technique for the next generation of mobile communication systems. In OFDM systems the information signal can be seen as divided and transmitted by several narrow band sub-carriers. Typically, for practical OFDM systems, the frequency spacing is less than the coherence band width and the symbol time is less than the coherence time. This means that a receiver and pilot estimation pattern that take advantage of the relatively large coherence band width and coherence time can manage with less pilot symbols, thereby minimizing the overhead introduced by the pilot symbols.

The use of pilot symbols for a channel estimation in OFDM systems is for example disclosed in "Pilot Assisted Channel Estimation for OFDM in Mobile Cellular Systems" of Tufvesson and Maseng, Department of Applied Electronics, Lund University, Sweden, VTC-97.

Recently a mapping of OFDM symbols in GSM timeslots such as to provide compatibility of an OFDM transmission system with the current GSM system has been proposed as it is shown in FIG. 1. As can be seen from FIG. 1, according to this known proposal, two OFDM symbols S1, S2 with respectively a time duration of 240 microseconds together with a guard time of 48 microseconds between two adjacent OFDM symbols S1, S2 and having a time duration of respectively 48 microseconds fit into one GSM timeslot with the known time duration of approximately 576.9 microseconds.

The guard time of the known proposal with a time duration of 48 microseconds has been designed for a worst case scenario, i.e. for large multipath effects as is the case e.g. when the user is moving fast in outdoor applications. For indoor applications, however, the guard time of 48 microseconds usually is not necessary, and the minimum necessary guard time in indoor applications with a slow moving user can be as small as e.g. 5 microseconds. Therefore, the guard time of 48 microseconds unnecessarily reduces the effective bit rate of the transmission.

However, it is not possible solely to minimize the guard time and to maximize the time duration of the OFDM symbols S1, S2, as a change of the time duration of the OFDM symbols automatically implies a modification of the subcarrier spacing of the subcarriers of the OFDM system due to the known properties of such a system.

SUMMARY OF THE INVENTION

The object of the present invention is to provide a mapping of data in an OFDM system with an improved effective bit transmission rate, and which can find application particularly in (slow moving) indoor applications or in low-range outdoor applications.

This object is achieved by means of the features of the independent claims. The dependent claims develop further the idea of the invention.

The central idea of the invention thereby is to reduce the guard time to the minimum necessary time duration and to use the saved time slot to interpose a midamble between two succeeding OFDM symbols. To maintain the subcarrier spacing of the subcarriers of the OFDM system and at the same time to provide for a midamble time duration shorter than the time duration of the OFDM symbols (e.g. 240 microseconds), the time duration of the midamble MA equals to 1/n of the time duration of the OFDM symbols, n being an integer greater than 1.

According to the present invention therefore a wireless transmission method using an OFDM system is provided comprising a plurality of equally spaced subcarriers. The transmission is effected in timeslots. One timeslot comprises two symbols having the same time duration. A midamble is introduced between respectively two OFDM-modulated symbols. The time duration of the midamble thereby corresponds to 1/n of the time duration of the symbols, n being an integer greater than 1.

The transmission of the midamble can be effected according to the OFDM system and only every n-th subcarrier can be modulated when transmitting the midamble.

The transmission of the midamble can be effected according to a single carrier system still maintaining OFDM-modulated symbols adjacent to the midamble.

The midamble can be used to transmit pilot symbols such as to effect the channel estimation for a coherent transmission.

A known training sequence can be used to create the pilot symbols by a single carrier modulation. The channel estimation can be performed by comparing the time to frequency transform of the known single carrier training sequence with a time to frequency transform of a received training sequence.

A channel estimation can be performed based on a received pilot symbol after effecting a discrete Fourier transform by comparing the received pilot subcarrier information with the known pilot sequence.

The channel estimation based on the midamble data can be valid for the two adjacent symbols.

The two symbols together with the midamble can fit into one timeslot of the GSM standard.

The midamble can be used for frequency and time synchronization by means of a correlation technique.

The transmission method as set forth above can particularly be used for indoor applications or low-range outdoor applications where only a small guard time is necessary.

The present invention furthermore provides for a wireless transmission system comprising a transmitter and a receiver using an OFDM system comprising a plurality of equally spaced subcarriers. The transmission is effected in timeslots, wherein one timeslot comprises two OFDM-modulated symbols having the same time duration. A midamble is interposed between said two OFDM-modulated symbols, wherein the time duration of the midamble corresponds to 1/n of the time duration of the symbols, n being an integer greater than 1.

The transmitter can be adapted to transmit the midamble according to the OFDM system and the transmitter can comprise a modulator modulating only every n-th subcarrier when transmitting the midamble.

The transmitter can be adapted to transmit the midamble according to a single carrier system.

The transmitter can transmit pilot symbols in the midamble and the receiver can comprise a channel estimator for effecting a channel estimation for a coherent transmission based on the received pilot symbols.

The two symbols together with the midamble can fit in one timeslot of the GSM standard.

The receiver can comprise correlation means for frequency and time synchronization based on a correlation of samples of the midamble.

The present invention furthermore provides for a transmitter for the transmission of data according to an OFDM system. The transmitter thereby comprises a collector for collecting data for a first symbol of a timeslot, data for a midamble and data for a second symbol of the timeslot in this order. The time duration of the midamble thereby corresponds to 1/n of the time duration of the first and second symbol, respectively, n being an integer greater than 1. The collector is connected with an OFDM modulator modulating at least the first and the second symbols on a plurality of subcarriers according to the OFDM system.

The transmitter furthermore can comprise a pilot symbol generating unit outputting pilot symbols to an inverse Fourier transformation circuit, wherein the pilot symbols output from the pilot symbol generating unit are supplied to the collector as data for the midamble. The modulator modulates the pilot symbols in the midamble on every n-th subcarrier of an OFDM system.

Alternatively the transmitter can comprise a training sequence generating means outputting a training sequence directly to the collector as data for the midamble. The modulator in this case modulates the training sequence in the midamble according to a single carrier system.

According to the present invention furthermore a receiver for an OFDM system is provided comprising a channel estimator for a coherent detection of OFDM modulated symbols. The channel estimator is adapted to effect a channel estimation based on pilot symbols of a midamble being interposed between two succeeding OFDM-modulated symbols. The time duration of the midamble thereby equals 1/n of the time duration of the symbols, n being an integer greater than 1.

The receiver can comprise a correlation unit for effecting a time in frequency synchronization of the receiver. The correlation unit is adapted to correlate samples of a midamble interposed between two succeeding OFDM-modulated symbols. The time duration of the midamble thereby equals 1/n of the time duration of the symbols, n being an integer greater than 1.

The present invention will now be explained by means of different embodiments of the present invention and taken in reference to the figures of the annexed drawings.

DETAILED DESCRIPTION OF THE DRAWINGS

Figure 1:
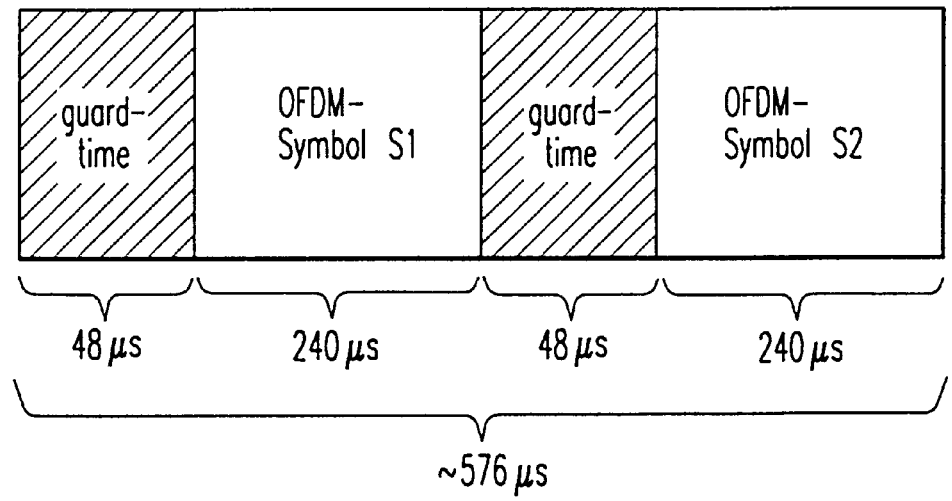
FIG. 1 shows a recent proposal for the mapping of OFDM symbols and guard times into one GSM timeslot.
Figure 2:
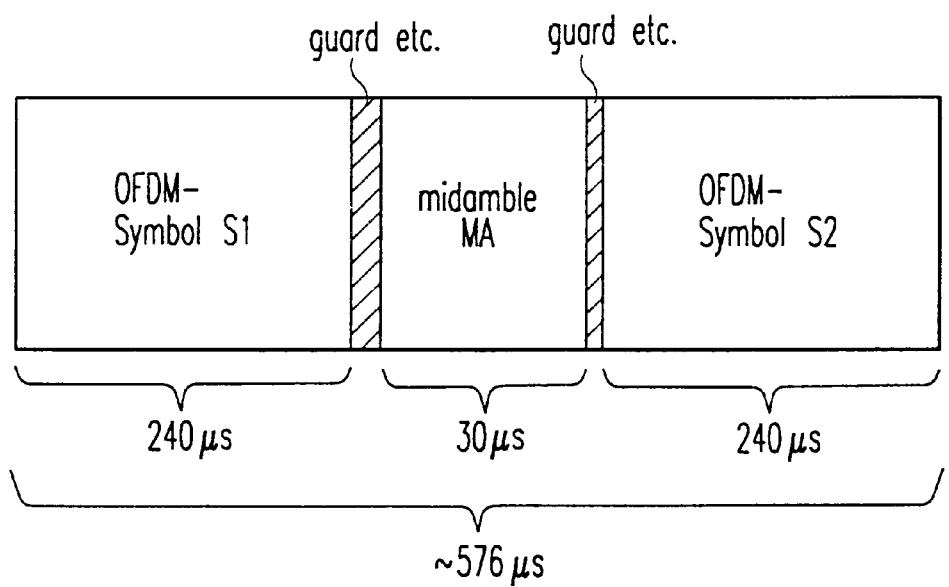
FIG. 2 shows the mapping of two OFDM symbols as well as a midamble into one GSM timeslot according to the present invention.

FIG. 2 shows an implementation of the central idea of the present invention. As can be seen form FIG. 2, according to the present invention one timeslot comprises in the following sequence a first OFDM modulated symbol S1, a midamble MA as well as a second modulated OFDM symbol S2. The midamble MA can also be OFDM modulated or alternatively single carrier modulated. Between the OFDM modulated symbol S1, S2 and the midamble MA additional small timeslots such as guard times, roll-off, etc. can be provided. The time duration of the midamble MA generally equals 1/n of the time duration of the OFDM symbols S1, S2. In the embodiment as shown in FIG. 2 the time duration of the midamble MA equals 30 microseconds, whereas the time duration of the OFDM modulated symbols S1, S2 is 240 microseconds. Together with the guard time, roll-off, etc. the OFDM modulated symbol S1, the midamble MA as well as the OFDM modulated symbol S2 fit exactly into one timeslot according to the GSM standard (576.9 microseconds).

The midamble MA according to the present invention is created by reducing the time duration of the guard time and melting the saved time of the different guard times together to create a timeslot for a midamble MA. The midamble MA can be used for the transmission of every kind of data, such as e.g. pilot symbols for a coherent detection or other traffic or system data.

Figure 3:
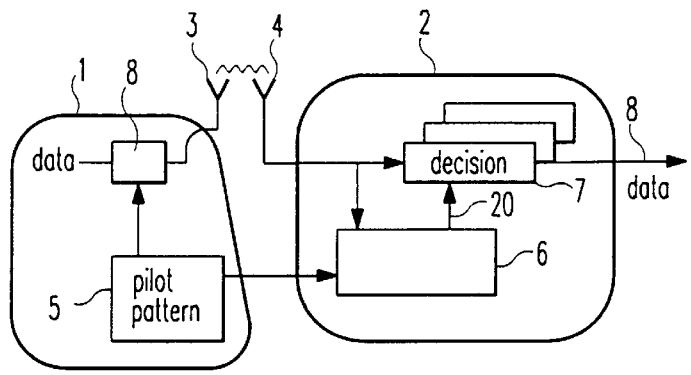
FIG. 3 shows generally a wireless transmission system according to the present invention which is particularly adapted for the use of OFDM modulated signals at least for the symbols of the timeslot.

FIG. 3 generally shows the structure of a wireless transmission system according to the present invention. The wireless transmission system according to the present invention comprises a transmitter 1 and a receiver 2. As is well-known the transmitter 1 comprises an antenna 3 and the receiver 2 comprises an antenna 4. In the example of FIG. 3 the transmitter 1 comprises a pilot pattern generating means 5. The pilot pattern (sequence) generated by the pilot pattern (sequence) generating means 5 is given to a channel estimator 6 of the receiver 2 as a known pilot pattern (sequence) in advance of the actual transmission of data. The known pilot (sequence) pattern is stored in a memory of the receiver 2.

The transmitter 1 comprises a collector 8 which outputs sequentially pilot patterns from the pilot pattern generating means 5 and actual data to be modulated and transmitted. On the reception side the receiver 2 receives the actual data as well as the transmitted pilot patterns. The channel estimator 6 compares the actual transmitted and received pilot patterns (sequences) with the known pilot sequence stored in a memory of the receiver 2 and outputs a channel estimation signal 20 to a decision circuit 7. Based on the channel estimation effected by the channel estimator 6 therefore a coherent detection of the modulated signals can be effected. Therefore coherently modulated data 8 can be output from the decision circuit 7 based on the channel estimation signal 20 of the channel estimator 6.

Figure 4:
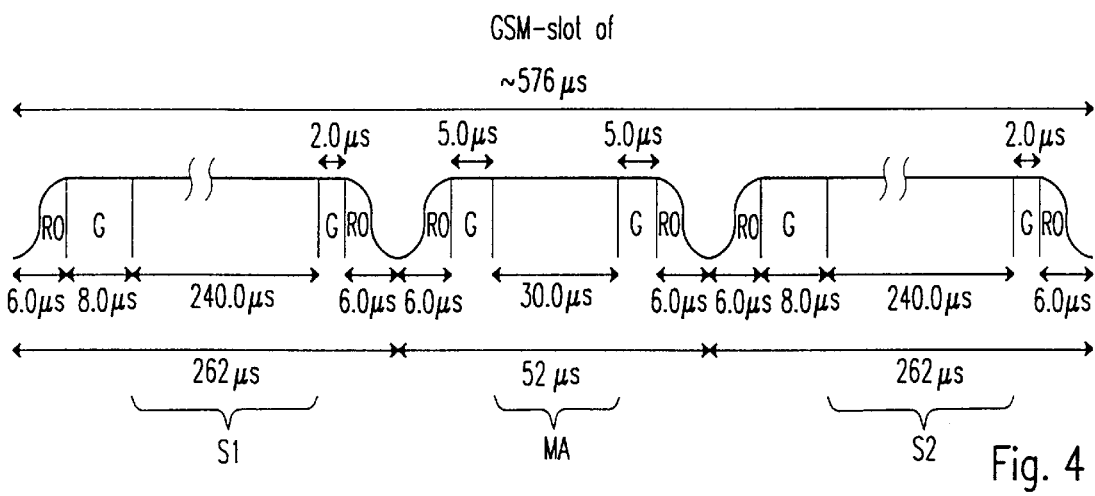
FIG. 4 shows the time parameters for the mapping of symbols and the midamble as shown in FIG. 2 into one GSM timeslot.

FIG. 4 shows in detail the mapping of OFDM modulated symbols S1, S2 and the midamble MA which has been shown generally in FIG. 2, together with preferred time parameters. The timeslot according to the present invention starts with a roll-off time of e.g. 6 microseconds followed by a guard time of e.g. 8 microseconds. Then the first OFDM symbol S1 with a time duration of 42 microseconds follows. As next timeslots a short guard time of 2 microseconds and a roll-off of 6 microseconds as well as a further roll-off of 6 microseconds and a further guard time of 5 microseconds follow. Then the midamble with a preferred time duration of 30 microseconds follows. Again a short guard time of 5 microseconds, roll-off of 6 microseconds, a further roll-off of 6 microseconds and a guard time of 8 microseconds follow. Then the second OFDM modulated symbol S2 with a time duration of 240 microseconds follows. The timeslot according to the present invention is completed by a guard time of two microseconds and a roll-off of 6 microseconds.

According to the time parameters as shown in FIG. 4 the OFDM symbols S1, S2, the midamble MA as well as the necessary short guard times, which are minimized in comparison to the state of the art (5 to 10 microsecond in comparison to about 48 microseconds) as well as the roll-off times fit exactly into one GSM timeslot with a time duration of approximately 576 microseconds.

Figure 5:
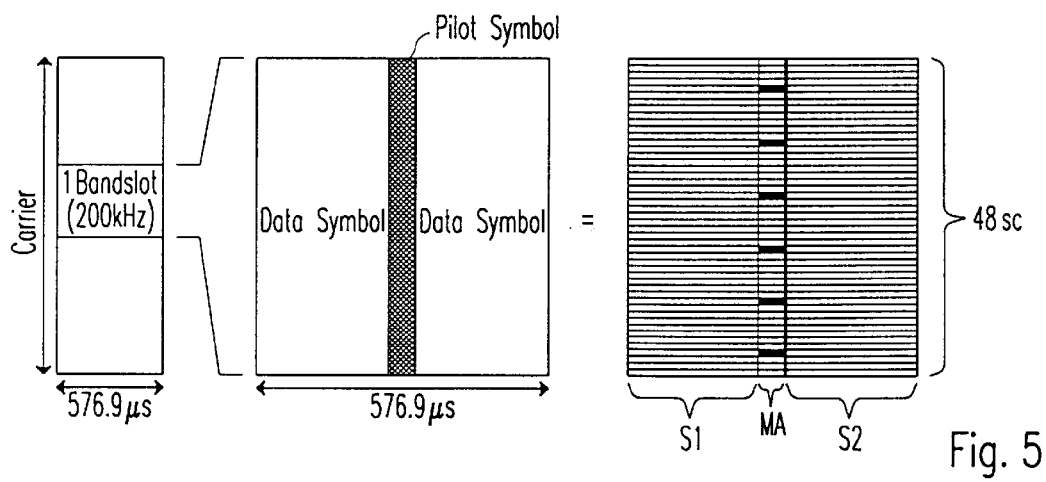
FIG. 5 shows an application of the present invention wherein the midamble is used for the transmission of pilot symbols according to an OFDM system, wherein only every n-th subcarrier is modulated when transmitting the midamble.

FIG. 5 shows the manner in which the midamble MA can be used for the transmission of pilot symbols for a coherent detection in the case that the midamble is also transmitted according to the OFDM system.

A midamble MA is a short OFDM symbol in the case of FIG. 5 and is solely used for channel sounding/estimation. The channel estimation is valid for the two adjacent traffic OFDM-modulated symbols S1, S2.

The short pilot symbol thereby is created by OFDM allocating only a subset of the totally available subcarriers SC. If e.g. the OFDM symbol duration is Ts, a short OFDM symbol (pilot symbol) can be created by allocating only every n-th subcarrier, resulting in a new reduced symbol duration of (TS/n). The subcarrier spacing, however, needs not to be changed.

Alternatively the pilot symbol can be created by a single carrier modulation with a known training sequence as it will be explained further below.

The channel estimation can then be performed based on the received pilot symbol (in the midamble) after discrete Fourier transformation (DFT) by comparing the received pilot subcarrier information with the known pilot sequence.

Alternatively the frequency domain transform of the known single carrier training sequence can be compared with the frequency domain transform of the received training sequence.

In the example as shown in FIG. 5, the short OFDM pilot symbol in the midamble is created by modulating every eighth subcarrier corresponding to a midamble time duration of 30 microseconds in case of a symbol time duration of 240 microseconds.

If single carrier modulation is used for the pilot sequence, the training sequence bandwidth has to match the bandwidth of the data OFDM symbols S1, S2.

Additionally or alternatively, the midamble (pilot symbol) can be used for time frequency synchronization of the transmission scheme based on a correlation technique of the samples of the midamble (pilot symbol). Of course, the midamble can furthermore be used for all types of traffic data and/or system data.

Figure 6:
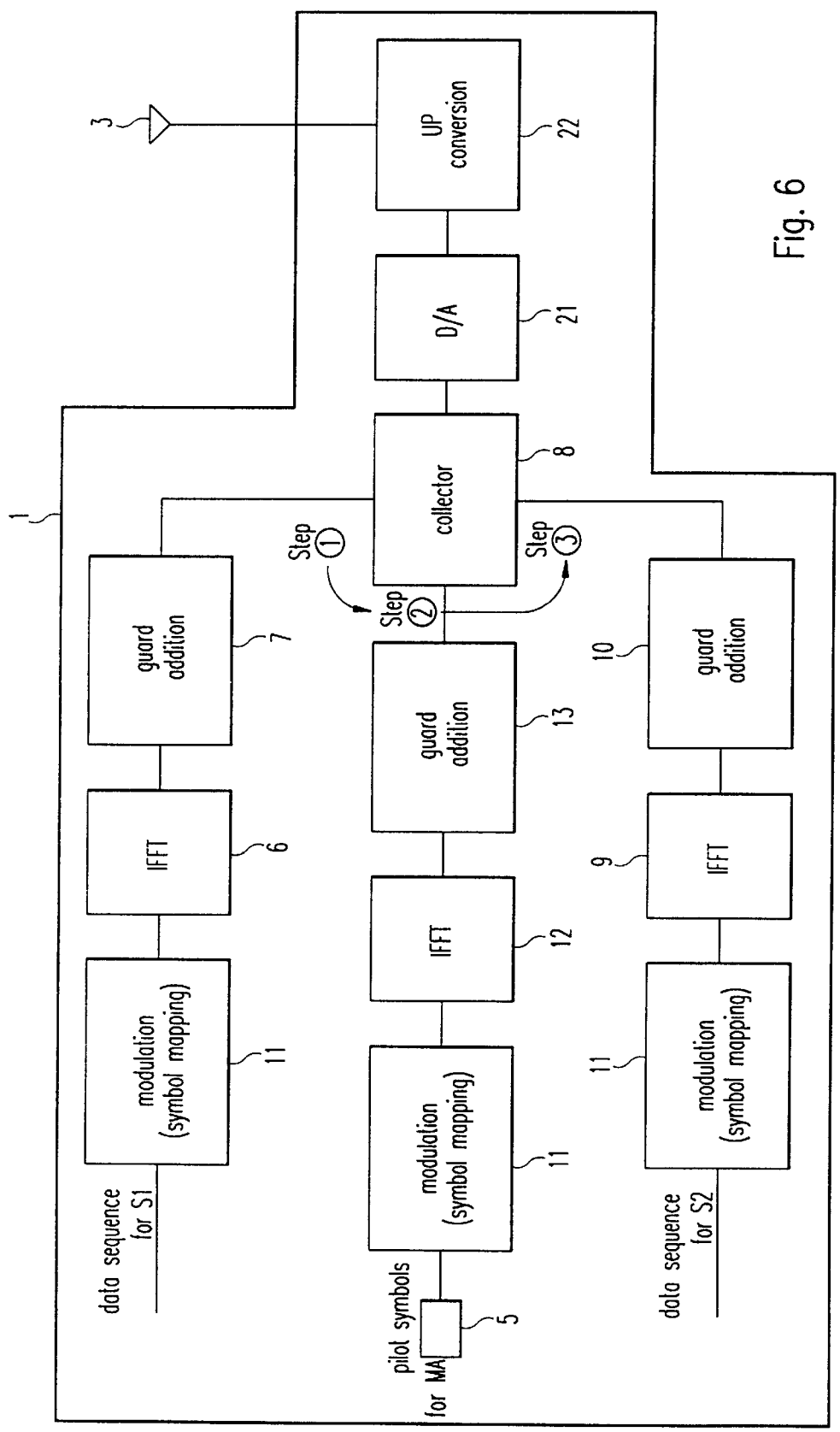
FIG. 6 shows a transmitter according to the present invention inserting pilot symbol in the midamble.

FIG. 6 shows the internal structure of a transmitter 1 according to the present invention. FIG. 6 relates to an embodiment in which the midamble MA and the included pilot symbols PS are transmitted according to an OFDM modulation scheme.

The central part thereby is a collector 8 collecting in this order a data sequence for the first OFDM-modulated symbol S1, pilot symbols for the midamble MA and a data sequence for the second OFDM-modulated symbol S2.

The data sequence for the first OFDM-modulated symbol S1 is supplied to a modulator 11 for the symbol mapping and then to an inverse fast Fourier transformation (IFFT) circuit 6. The output of the inverse fast Fourier transformation (IFFT) circuit 6 is supplied to a guard addition circuit 7 adding the guard times. The output of the guard addition circuit 7 is supplied to the collector 8 as data for the first OFDM-modulated symbol S1 (step 1).

On the other hand pilot symbols PS are created by a pilot symbol generation circuit 5. The pilot symbols PS output by the pilot symbol generation circuit 5 are supplied to a modulator 11 for the symbol mapping and then to an inverse fast Fourier transformation (IFFT) circuit 12. The output of the inverse fast Fourier transformation (IFFT) circuit 12 is supplied to a guard addition circuit 13 adding the necessary guard times. The output of the guard addition circuit 13 is given to the collector 8 as data for the midamble of the corresponding timeslot (step 2).

A data sequence for the second OFDM-modulated symbol S2 is supplied to a modulator 11 for the symbol mapping and then to an inverse fast Fourier transformation circuit (IFFT) 9. The output of the inverse fast Fourier transformation (IFFT) circuit 9 is given to a guard addition circuit 10 adding the necessary guard times. The output of the guard addition circuit 10 is then supplied to the collector 8 as data for the second OFDM-modulated symbol S2 (step 3).

The collector 8 outputs the data of a timeslot to a D/A converter 21, which output is supplied to an up-converter 22. By means of the OFDM modulators 11 effecting a symbol mapping and the following IFFT circuits 6, 9 the data for the first and second OFDM-modulated symbol S1, S2 are modulated on the full band width, i.e. on all subcarriers of the OFDM system. According to the inherent properties of the OFDM system the IFFT distributes the data to be transmitted over the subcarriers.

In case of the midamble MA, however, the OFDM modulator 11 effects a symbol mapping such that by the following IFFT 12 only every n-th subcarrier of the OFDM system is modulated. According to the embodiment of FIG. 6 therefore the midamble and the included pilot symbols PS are therefore transmitted according to an OFDM modulation scheme.

Figure 7:
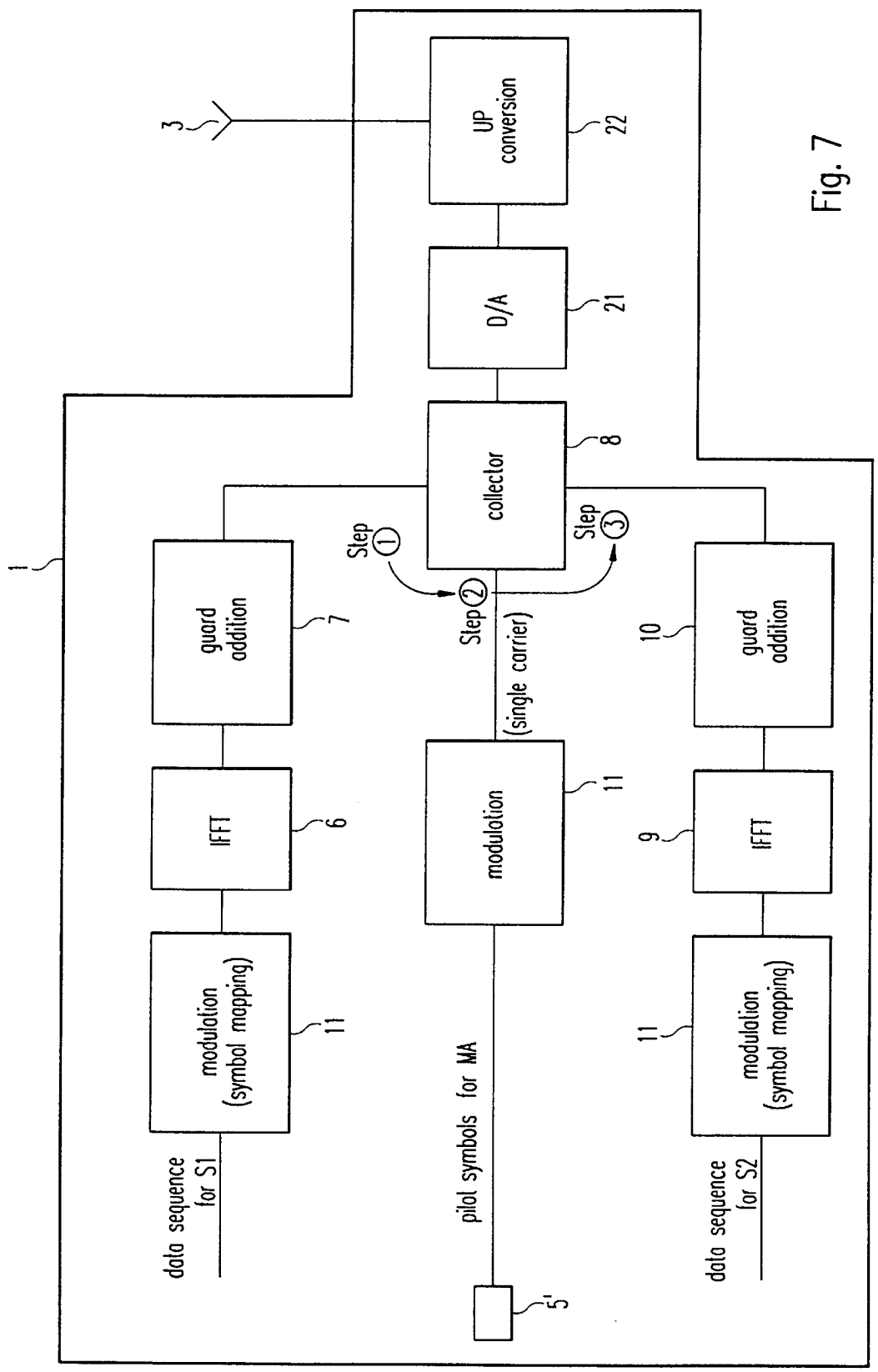
FIG. 7 shows another transmitter for wireless transmission of OFDM modulated signals according to the present invention inserting a training sequence in the midamble.

FIG. 7 shows another embodiment, wherein the midamble MA is used to transmit a training sequence based on a single carrier modulation scheme as it is known f.e. from the DECT or GSM standard. The difference between the embodiment of FIG. 7 and FIG. 6 is that in the case of the embodiment according to FIG. 7 a training sequence generation unit 5' directly supplies a training sequence modulated on the full bandwidth by a modulator 11 to the collector 8 as data for the midamble MA without IFFT. As there is no IFFT in this case, the data for the midamble are transmitted on the full bandwidth of a single carrier system in step 2.

Figure 8:
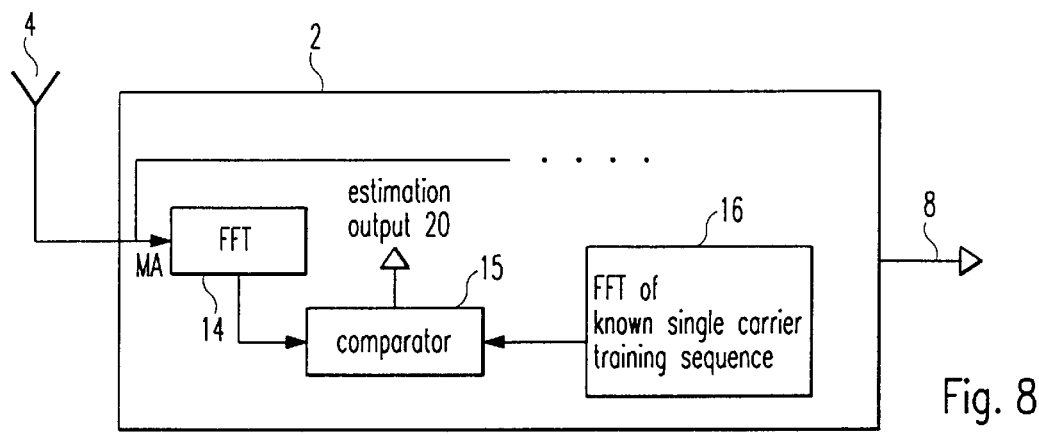
FIG. 8 shows a part of a receiver according to the present invention effecting a channel estimation.

FIG. 8 shows a receiver according to the present invention. The receiver 2 thereby comprises a comparator 15 such as to provide a channel estimation output 20 for a coherent detection of the modulation signals. The data of the midamble MA (pilot symbols) thereby are supplied to a fast Fourier transformation circuit 14. The output of the fast Fourier transformation circuit 14 is supplied to the comparator 15. Furthermore, the fast Fourier transformation of a known single carrier training sequence is output from a memory 16 to the comparator 15. Therefore, in case of a single carrier modulated training sequence the comparator 15 compares the fast Fourier transformation of the known single carrier training sequence stored in a memory 16 with the fast Fourier transformation 14 of the actually received training sequence in the midamble of the timeslot and outputs an estimation output signal 20.

Figure 9:
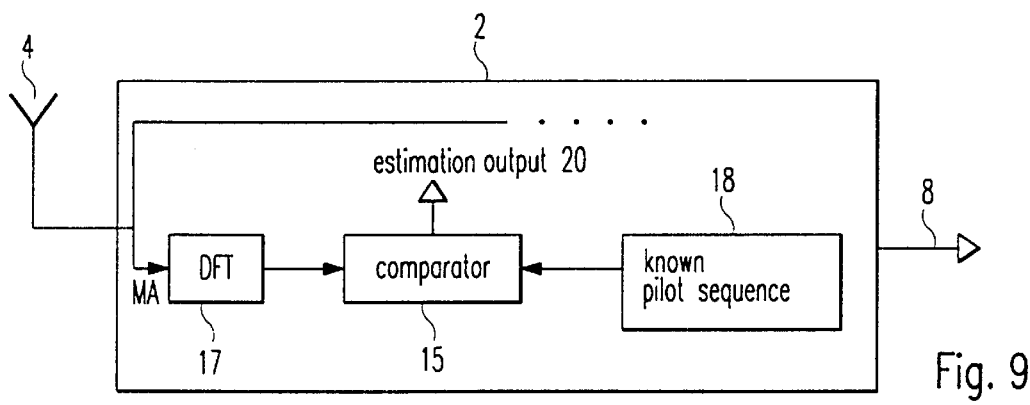
FIG. 9 shows a part of another receiver according to the present invention effecting a channel estimation.

FIG. 9 shows a receiver 2 according to the present invention, wherein this embodiment relates to the case that the pilot symbols in the midamble of the timeslot have also been modulated according to an OFDM modulation scheme (only every n-th subcarrier has been modulated, however). In this case the pilot symbols modulated on every n-th subcarrier of the OFDM system of the midamble MA are input to a discrete Fourier transformation (DFT) circuit 17. The comparator 15 according to this embodiment compares the output signal of the discrete Fourier transformation circuit (DFT) 17 with a known pilot-symbol sequence stored in advance in a memory 18 of the receiver 2. Then the comparator 15 outputs an estimation output signal 20 to be used for a coherent detection of the modulated signals.

Figure 10:
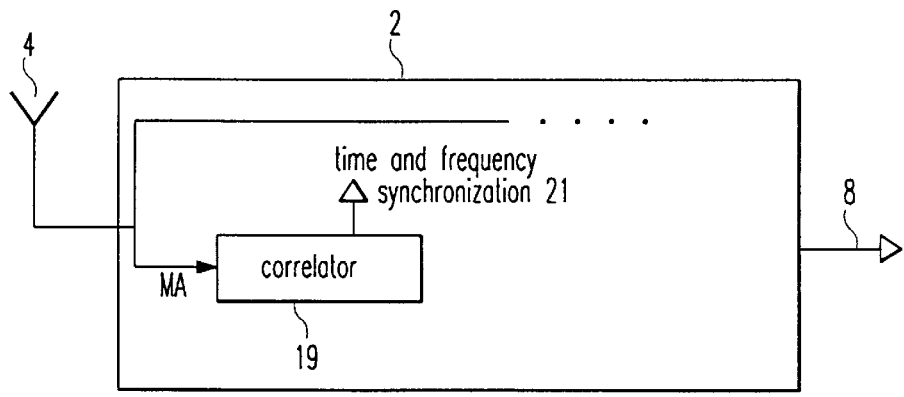
FIG. 10 shows a part of still another receiver according to the present invention effecting a correlation technique.

FIG. 10 shows an embodiment wherein the data (pilot signals) contained in the midamble MA of the timeslot are used for a time and frequency synchronization. In this case a correlator 19 in the receiver 2 correlates the samples of the midamble (pilot signals) of the timeslot and outputs a time and frequency synchronization signal 21.

According to the present invention thereby a coherent modulation OFDM slot structure compatible with GSM standard is defined. The invention furthermore comprises a definition of optimized pilot allocation schemes. Different length (time) of the data OFDM symbols and the pilot OFDM symbols can be achieved by adjusting the subcarrier spacing for the OFDM. The midamble can furthermore be utilized for precise synchronization of the time and frequency of the transmission scheme.

What is claimed is:

1. Wireless transmission method using an OFDM system comprising a plurality of equally spaced subcarriers (SC), wherein the transmission is effected in time slots and one time slot comprises two symbols (S1, S2) having the same time duration, characterized in that a midamble (MA) is introduced (8) between respectively two OFDM modulated symbols (S1, S2), wherein the time duration of the midamble (MA) corresponds to 1/n of the time duration of the symbols (S1, S2), n being an integer greater than 1.

2. Wireless transmission method according to claim 1, characterized in that the transmission of the midamble (MA) is effected according to the OFDM system and only every n-th subcarrier (SC) is modulated (11) when transmitting the midamble (MA).

3. Wireless transmission method according to claim 1, characterized in that the transmission of the midamble (MA) is effected according to a single carrier system.

4. Wireless transmission method according to claim 1, characterized in that the midamble (MA) is used to transmit pilot symbols (PS) such as to effect a channel estimation (6) for a coherent transmission.

5. Wireless transmission method according to claim 4, characterized in that a known training sequence (5') is used to create the pilot symbols (PS) by single carrier modulation (11).

6. Wireless transmission method according to claim 5, characterized in that the channel estimation (6) is performed by comparing (15) the frequency domain transform of the known single carrier training sequence (16) with the frequency domain transform (14) of a received training sequence.

7. Wireless transmission method according to claim 4, characterized in that a channel estimation (6) is performed based on a received pilot symbol after effecting a discrete Fourier transform (17) by comparing (15) the received pilot subcarrier information with the known pilot sequence (18).

8. Wireless transmission method according to claim 4, characterized in that the channel estimation (6) based on the midamble (MA) is valid for the two adjacent symbols (S1, S2).

9. Wireless transmission method according to claim 1, characterized in that the two symbols (S1, S2) and the midamble (MA) fit into one time slot of the GSM standard.

10. Wireless transmission method according to claim 1, characterized in that the midarnble (MA) is used for frequency and time synchronization by means of a correlation technique (19).

11. Wireless transmission method according to claim 1, characterized in that it is used for indoor-applications or low-range outdoor-applications.

12. Wireless transmission system comprising a transmitter (1) and a receiver (2) using an OFDM system comprising a plurality of equally spaced subcarriers (SC)

wherein the transmission is effected in time slots and one time slot comprises two OFDM modulated symbols (S1, S2) having the same time characterized in that a midamble (MA) is interposed between said two OFDM modulated symbols (S1, S2), wherein the time duration of the midamble (MA) corresponds to 1/n of the time duration of the symbols (S1, S2), n being an integer greater than 1.

13. Wireless transmission system according to claim 12, characterized in that the transmitter (1) is adapted to transmit the midamble (MA) according to the OFDM system and the transmitter (1) comprises a modulator (11) modulating only every n-th subcarrier (SC) when transmitting the midarnble (MA).

14. Wireless transmission system according to claim 12, characterized in that the transmitter (1) is adapted to transmit the midamble (MA) according to a single carrier system.

15. Wireless transmission system according to claim 12, characterized in that the transmitter (1) transmits pilot symbols (PS) in the midamble (MA) and the receiver (2) comprises a channel estimator (6) effecting a channel estimation for a coherent transmission based on the received pilot symbols (PS).

16. Wireless transmission system according to claim 12, characterized in that the two symbols (S1, S2) and the midamble (MA) fit into one time slot of the GSM standard.

17. Wireless transmission system according to claim 12, characterized in that the receiver (1) comprises correlation means (19) for frequency and time synchronization (21) based on a correlation of samples of the midamble (MA).

18. Transmitter for the transmission of data according to an OFDM system, comprising a collector (8) for collecting data for a first symbol (S1) of a time slot, data for a midamble (MA) and data for a second symbol (S2) of the time slot in this order, wherein the time duration of the midamble (MA) corresponds to 1/n of the time duration of the first and second symbol (S1, S2), respectively, n being an integer greater than 1, the collector (8) being supplied with the outputs of circuits modulating at least the first and the second symbols (S1, S2) on a plurality of subcarriers (SC) of the OFDM system.

19. Transmitter according to claim 18, characterized by a pilot symbol generating unit (5) outputting pilot symbols (PS) to an inverse Fourier transformation circuit (13), wherein the pilot symbols (PS) of the pilot symbol generating unit (5) are supplied by means of an inverse fast Fourier transformation (IFFT) circuit 12 to the collector (8) as data for the midamble (MA).

20. Transmitter according to claim 18, characterized by training sequence generating means (5') outputting a training sequence Without any transformation to the collector (8) as data for the midamble (MA), wherein the modulator (11) modulates the training sequence in the midamble (MA) according to a single carrier system.

21. Receiver for an OFDM system comprising a channel estimator (6) for a coherent detection of OFDM modulated symbols (S1, S2), wherein the channel estimator (6) being adapted to effect a channel estimation based on pilot symbols (PS) of a midamble (MA) interposed between two succeeding OFDM modulated symbols (S1, S2), and the time duration of the midamble (MA) equals 1/n of the time duration of the OFDM modulated symbols (S1, S2), n being an integer greater than one.

22. Receiver for an OFDM system, comprising a correlation unit (19) for effecting a time and frequency synchronisation (21) of the receiver (2), wherein the correlation unit (19) is adapted to correlate samples of a midamble (MA) interposed between two succeeding OFDM modulated symbols (S1, S2), and the time duration of the midamble (MA) equals 1/n of the time duration of the OFDM modulated symbols (S1, S2), n being an integer greater than one.

* * * * *